United States Patent
Dodds et al.

(10) Patent No.: US 9,441,636 B2
(45) Date of Patent: Sep. 13, 2016

(54) ROTOR FOR A COMPRESSOR OF A GAS TURBINE

(75) Inventors: John Dodds, Derby (GB); Jillian C. Gaskell, Derby (GB); Michael A. Howard, Derby (GB)

(73) Assignee: ROLLS-ROYCE plc, London (GB)

( * ) Notice: Subject to any disclaimer, the term of this patent is extended or adjusted under 35 U.S.C. 154(b) by 1185 days.

(21) Appl. No.: 13/557,620

(22) Filed: Jul. 25, 2012

(65) Prior Publication Data

US 2013/0052022 A1    Feb. 28, 2013

(30) Foreign Application Priority Data

Aug. 25, 2011   (GB) .................................. 1114674.3

(51) Int. Cl.
  *F04D 29/38*  (2006.01)
  *F04D 29/32*  (2006.01)
  *F01D 5/14*   (2006.01)

(52) U.S. Cl.
  CPC ............. *F04D 29/324* (2013.01); *F01D 5/141* (2013.01); *F04D 29/384* (2013.01); *Y02T 50/671* (2013.01); *Y02T 50/673* (2013.01)

(58) Field of Classification Search
  CPC ...... F01D 5/141; F01D 5/143; F04D 29/324; F04D 29/384
  USPC ....... 415/218.1, 219.1, 914; 416/223 A, 234, 416/243, DIG. 2, DIG. 5, 223 R, 188, 244 A, 416/245 R
  See application file for complete search history.

(56) References Cited

U.S. PATENT DOCUMENTS

| | | | |
|---|---|---|---|
| 2,415,847 A | | 2/1947 | Redding |
| 2,859,909 A | * | 11/1958 | Stalker ........................ 415/219.1 |
| 2,952,403 A | * | 9/1960 | Stalker .................... F01D 5/143 |
| | | | 415/192 |
| 3,059,834 A | * | 10/1962 | Hausammann ............... 416/237 |
| 7,780,419 B1 | | 8/2010 | Matheny et al. |
| 2008/0226454 A1 | * | 9/2008 | Decker ............... F04D 25/0606 |
| | | | 416/203 |
| 2009/0180891 A1 | * | 7/2009 | Chivers et al. ........... 416/244 A |
| 2010/0260610 A1 | * | 10/2010 | Kappis et al. ............. 416/223 R |
| 2011/0081252 A1 | * | 4/2011 | Li ......................... F04D 29/324 |
| | | | 416/241 R |

FOREIGN PATENT DOCUMENTS

| | | |
|---|---|---|
| CN | 102094848 A | 6/2011 |
| EP | 1 754 859 A2 | 2/2007 |
| FR | WO 2011/033206 A1 | 3/2011 |
| JP | A-7-269492 | 10/1995 |

OTHER PUBLICATIONS

Search Report issued in British Patent Application No. 1114674.3 dated Dec. 12, 2011.

* cited by examiner

*Primary Examiner* — Christopher Verdier
(74) *Attorney, Agent, or Firm* — Oliff PLC

(57) ABSTRACT

A rotor, for a compressor of a gas turbine, comprising a rotatable support for rotation about an axis of rotation and a plurality of blades. Each blade comprising a hub, a leading edge and a trailing edge and a chord is defined between the leading edge and the trailing edge. Each of the blades extends from its hub away from the rotatable support and at least one of the blades has a hub-thickness to chord ratio greater than 10 percent. The leading edge of the at least one of the blades at its hub is positioned at a leading-edge-hub-radius from a position of the axis of rotation and the trailing edge of the at least one of the blades is positioned at its hub at a trailing-edge-hub-radius from the position of the axis of rotation. The trailing-edge-hub-radius is greater than the leading-edge-hub-radius.

21 Claims, 3 Drawing Sheets

ROTOR FOR A COMPRESSOR OF A GAS TURBINE

FIELD OF THE INVENTION

Embodiments of the present invention relate to a rotor, for a compressor for a gas turbine.

BACKGROUND TO THE INVENTION

Gas turbines are now widely used and have many applications including, for example, in powering air travel, in powering sea travel and in electricity generation.

The design of gas turbines is an extremely complex task as there are many competing demands that need to be balanced and met. For example, gas turbines used for powering travel may be designed to be light but also need to maintain an acceptable level of efficiency.

Other demands on the gas turbine, such as level of emissions and noise levels must also be considered. Furthermore, the effect of changing one part of a gas turbine on every other part of the gas turbine must also be considered.

The stability/operability of the gas turbine must also be considered across the entire range of operating speeds of the gas turbine. Gas turbines are designed for a particular speed of operation, the design point of the gas turbine, however, they must also operate safely away from the design point. For example, the gas turbine must have acceptable stability margins when running at low speeds during start up of the gas turbine and also at speeds higher than the design point of the gas turbine.

BRIEF DESCRIPTION OF VARIOUS EMBODIMENTS OF THE INVENTION

Some embodiments of the present invention provide a rotor for a compressor of a gas turbine that has thicker blades, at least at the hub of the blades. Some embodiments of the present invention also allow for higher aerodynamic duty or work to be done by the rotor while maintaining acceptable stability/operability margins.

According to various, but not necessarily all, embodiments of the invention there is provided a rotor, for a compressor of a gas turbine, comprising:

a rotatable support for rotation about an axis of rotation; and a plurality of blades, each blade comprising a hub, a leading edge and a trailing edge wherein a chord is defined between the leading edge and the trailing edge and wherein:

each of the blades extends from its hub away from the rotatable support;

at least one of the blades has a hub-thickness to chord ratio greater than 10 percent;

the leading edge of the at least one of the blades at its hub is positioned at a leading-edge-hub-radius from a position of the axis of rotation; and the trailing edge of the at least one of the blades is positioned at its hub at a trailing-edge-hub-radius from the position of the axis of rotation wherein the trailing-edge-hub-radius is greater than the leading-edge-hub-radius.

According to various, but not necessarily all, embodiments of the invention there is provided a gas turbine comprising a rotor as described above.

According to various, but not necessarily all, embodiments of the invention there is provided a blade, for replacing a blade of a compressor of a gas turbine, comprising:

a hub, a leading edge and a trailing edge wherein a chord is defined between the leading edge and the trailing edge, the blade having a hub-thickness to chord ratio greater than 10 percent;

wherein in use:

the blade is connected to a rotatable support for rotation about an axis of rotation and, when connected, extends from its hub away from the rotatable support;

the leading edge of the blade at its hub is positioned at a leading-edge-hub-radius from a position of the axis of rotation; and the trailing edge of the blade at its hub is positioned at a trailing-edge-hub-radius from the position of the axis of rotation wherein the trailing-edge-hub-radius is greater than the leading-edge-hub-radius.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1A:
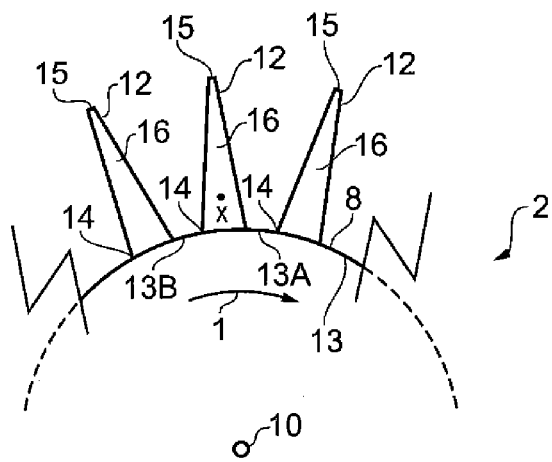
FIG. 1A illustrates, in axial cross-section view, an example of part of a rotor.

The Figures illustrate an example of a rotor 2, for a compressor 4 of a gas turbine 6 comprising a rotatable support 8 for rotation about an axis of rotation 10; and a plurality of blades 12, each blade comprising a hub 14, a leading edge 16 and a trailing edge 18 wherein a chord 20 is defined between the leading edge 16 and the trailing edge 18 and wherein: each of the blades 12 extends from its hub 14 away from the rotatable support 8; at least one of the blades 12 has a hub-thickness to chord ratio greater than 10 percent; the leading edge 16 of the at least one of the blades 12 at its hub 14 is positioned at a leading-edge-hub-radius 24 from a position of the axis of rotation 10; and the trailing edge 18 of the at least one of the blades 12 at its hub 14 is positioned at a trailing-edge-hub-radius 26 from the position of the axis of rotation 10 wherein the trailing-edge-hub-radius 26 is greater than the leading-edge-hub-radius 24.

Figure 5:
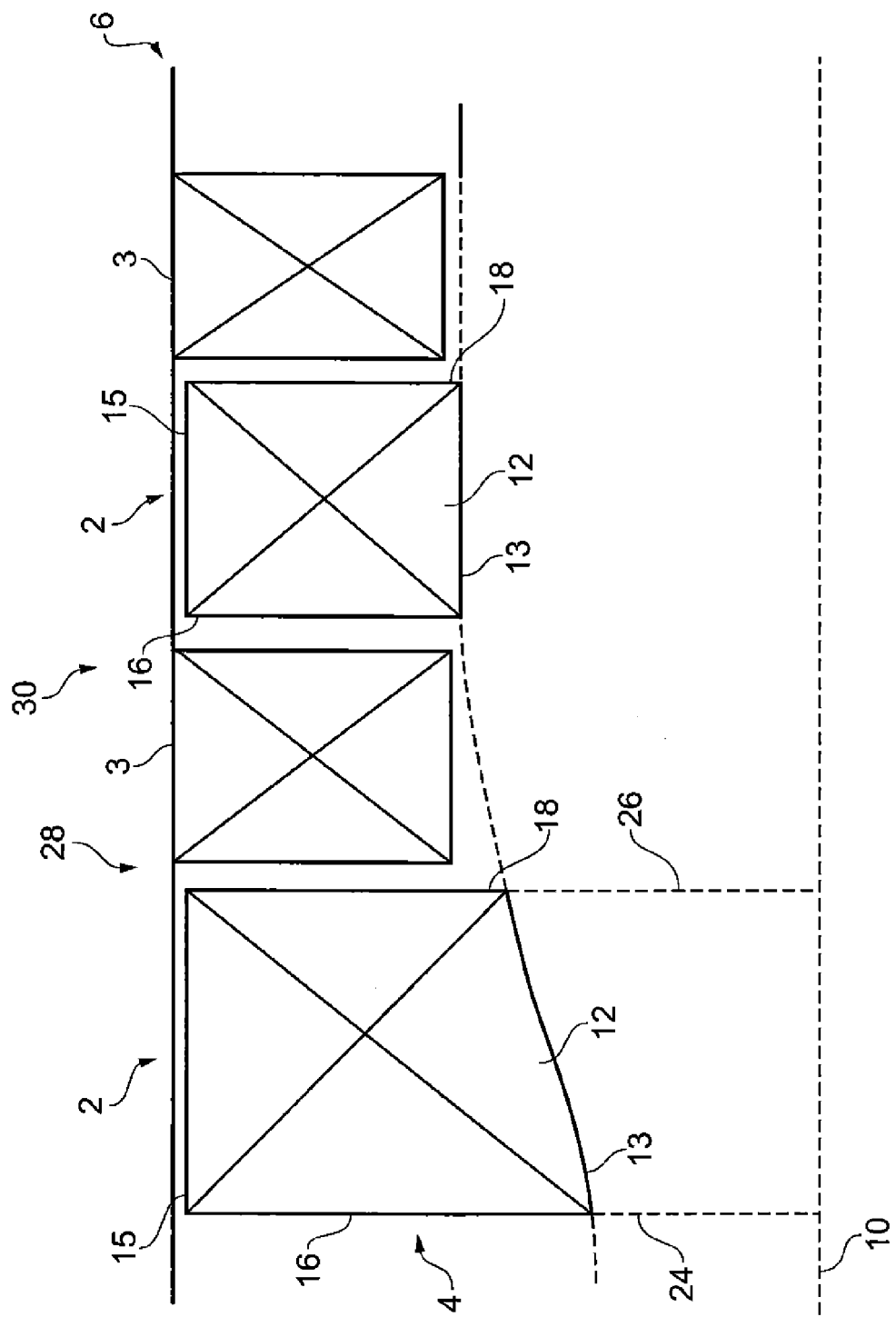
FIG. 5 is a schematic illustration of at least part of a compressor in a gas turbine.

FIG. 1A illustrates an example of an axial cross-section view of part of a rotor 2. In use, as illustrated in FIG. 5, the rotor 2 is located in a compressor 4 of a gas turbine 6 and may be rotated at high speed about an axis of rotation. The position of the axis of rotation 10 is indicated in the figures.

Continuing with the description of FIG. 1A, the rotor 2 comprises a plurality of blades 12 that are connected to and supported by a rotatable support 8. The rotatable support 8 is configured to rotate about a position of an axis of rotation 10 of a gas turbine 6 (illustrated in FIG. 5). Only part of the rotor 2 is illustrated in FIG. 1A.

Each of the blades 12 has a tip 15 and a hub 14 and extends from its hub 14 away from the rotatable support 8 in a radial direction to its tip 15. The radial direction is relative to an origin at the position of the axis of rotation 10 and is orthogonal to the axis of rotation. The rotor 2 is configured such that the distance between the position of the axis of rotation 10 and the tip 15 of each blade 12 is substantially the same for each of the blades 12.

A leading edge 16 of the blades can also be seen in FIG. 1A. The blades 12 will be described in greater detail below with reference to FIGS. 1B and 1C.

The rotor 2 also comprises an endwall 13 on either side of the blades 12. In use the rotor 2 is rotated in the direction of rotation 1 indicated in FIG. 1A. The endwall 13 has a forward endwall section 13A adjacent a central blade 12 in the direction of rotation 1 of the rotor 2 when in use. The endwall 13 has a rearward endwall section 13B adjacent the same blade 12 opposite to the direction of rotation 1 of the rotor 2 when in use. The forward endwall section 13A and the rearward endwall section 13B are therefore on either side of the blade 12 (as illustrated for a central blade in FIG. 1A).

The plurality of blades 12 are spaced evenly around the rotatable support 8 such that the distance between each of the blades 12 around the rotatable support 8 is substantially the same for all of the blades 12.

As illustrated in FIG. 1A, the forward endwall section 13A of a central blade 12 is contiguous with a rearward endwall section of the blade 12 that is adjacent the central blade 12 in the direction of rotation 1. Similarly, the rearward endwall section 13B of the central blade 12 is contiguous with the forward endwall section of the blade 12 adjacent to the central blade 12 opposite to the direction of rotation 1.

Figure 1B:
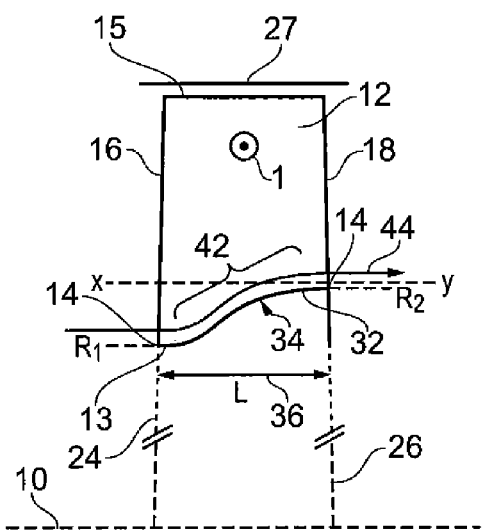
FIG. 1B illustrates in meridional view a blade illustrated in FIG. 1A.

The point marked X on the central blade 12 of FIG. 1A illustrates the position of the straight line X-Y in FIG. 1B as viewed from the viewpoint of FIG. 1A.

A person skilled in the art would understand that, although only part of the rotor 2 is shown in FIG. 1A, the complete rotor 2 is designed such that it may be rotated at high speeds without experiencing excess vibratory stress that may, for example, cause damage to the rotor 2 or gas turbine 6 or prevent the gas turbine 6 from functioning as required.

FIG. 1B illustrates a meridional view of a blade 12 illustrated in FIG. 1A. The blade 12 in FIG. 1B is illustrated such that, in use, the direction of rotation 1 indicated in FIG. 1A is towards the viewer.

The blade 12, illustrated in FIG. 1B, has a hub 14, a tip 15, a leading edge 16 and a trailing edge 18. The leading edge 16 and trailing edge 18 extend between the hub 14 and the tip 15 of the blade 12.

Figure 1C:
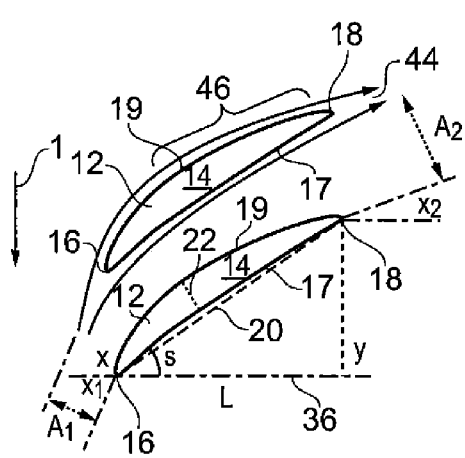
FIG. 1C illustrates a blade to blade view of part of the rotor illustrated in FIG. 1A.

A chord 20, as illustrated in FIG. 1C, is defined as a straight line between the leading edge 16 and the trailing edge 18 of the blade 12. The axial chord 36 of the blade 12 is defined as the projection of the chord 20, illustrated in FIG. 1C, onto the axis of rotation and has a length Las illustrated in FIG. 1B.

A casing 27 of the gas turbine 6 is also illustrated in FIG. 1B and is located above the tip 15 of the blade 12.

The leading edge 16 of the blade 12 at its hub 14 is positioned at a leading-edge-hub-radius 24 from the position of the axis of rotation 10 and the trailing edge 18 of the blade 12 at its hub 14 is positioned at a trailing-edge-hub-radius 26 from the position of the axis of rotation 10. As can be seen from FIG. 1B the trailing-edge-hub-radius 26 is greater than the leading-edge-hub-radius 24.

The endwall 13 has a profile 32 between the leading edge 16 of the blade 12 at its hub and the trailing edge of the blade 18 at its hub. The difference between the trailing-edge-hub-radius 26 and the leading-edge-hub-radius is determined by the profile 32 of the endwall 13. In the illustrated example the profile 32 rises between the leading edge 16 and the trailing edge 18 of the blade 12.

In general, a position of the hub 14 from the position of the axis of rotation 10 is defined by a hub radius. The profile 32 of the endwall 13 causes the hub radius of the blade 12 to vary as a function r dependent upon x, where x is the direction of the axis of rotation.

In the illustrated example the hub radius $r(x)$ between the leading edge 16 and the trailing edge 18 has a minimum at the leading edge 16 and a maximum at the trailing edge 18 and has no local maxima or minima between the leading edge 16 and the trailing edge 18.

In the illustrated example, $r(x)$ increases with x from the leading-edge-hub-radius 24 to the trailing-edge-hub-radius 26 and has a single point of inflection 34 in between. In other examples $r(x)$ could have one or more additional points of inflection or fewer points of inflection. The profile 32 of the forward endwall section 13A, illustrated in FIG. 1A, can be seen in FIG. 1B.

In some embodiments the hub radius is axi-symmetric with respect to the axis of rotation. That is, the profile of the forward endwall section 13A and the profile of the rearward endwall section 13B are substantially the same. In other embodiments the hub radius defined by the endwall 13 is axi-non-symmetric and the profiles of the forward and rearward endwall sections 13A and 13B are different.

In use, the rotor 2 is rotated and air flows across the blade 12 substantially in the direction from the leading edge 16 of the blade 12 to the trailing edge 18 of the blade 12. In the meridional plane, as the air moves across the blade the air flows through the passage defined by the casing 27 and the endwall 13.

As illustrated in FIG. 1B, due to the profile of the endwall 13 of the rotor 2, the height of the passage that the air flows through as it passes across the blade 12 reduces from the leading edge 16 of the blade 12 to the trailing edge 18 of the blade 12. In the absence of the blade 12, the airflow would be accelerated due to the narrowing of the passage, in the meridional plane, and there would be a corresponding fall in the static pressure of the airflow. Despite this however, overall there is a rise in the static pressure of the airflow across the blade 12 due to the turning (diffusion) in the blade-to-blade direction as shown in FIG. 1C.

The relative acceleration (relative to an axially horizontal end wall with no contraction) of the flow 42 of the streamline 44 of the flow of air across the blade 12 in the region of the hub 14 is illustrated in FIG. 1B.

The properties of the single blade 12 described above may be generalised to each of the plurality of blades 12 of the rotor 2 such that the rotor 2 is balanced when the rotor 2 is rotated at high speed in use. For example, each of the blades 12 of the plurality of blades may be as described above and illustrated in FIG. 1B. By way of another example, every other blade of the plurality of blades may be as described above and illustrated in FIG. 1B.

FIG. 1C illustrates a blade to blade view of part of the rotor 2 illustrated in FIG. 1A. In FIG. 1C the blades 12 are illustrated in cross section. The cross section of the blades 12 illustrated in FIG. 1C is taken at the hub 14 of the blades 12 and therefore illustrates an example of the variation in the thickness of the blades 12 from the leading edge 16 to the trailing edge 18 of the blades 12 at the hub 14 of the blades 12.

The thickness 22 of the blades 12 is taken at the widest point of the blade 12 between the leading edge 16 and the trailing edge 18 as illustrated in FIG. 1C. The thickness 22 is a diameter of the largest circle that can be placed between the sides 17, 19 of a blade 12 such that the circumference of the circle touches but does not cross the sides 17, 19.

The chord 20 and the axial chord 36 of the blades 12 are illustrated in FIG. 1C and the line X-Y illustrated in FIG. 1C corresponds to the line X-Y illustrated in FIG. 1B. As illustrated in FIG. 1C the blades 12 have a stagger S. The stagger S of the blades 12 is the angle between the chord 20 and the axial chord 36. In the illustrated example, the axial chord 36 is shorter than the chord 20 due to the stagger S of the blade.

The rotor 2 is rotated in the direction of rotation 1. Air flows across the blades 12 as indicated by the arrows indicating the streamline 44 across one of the blades illustrated in FIG. 1C. The blades 12 are of aerofoil shape and therefore as the air flows across the blades 12 the blades 12 have a pressure side 17 and a suction side 19 as is well known in the field of aerofoils.

As the air flows across the blades 12 it is compressed due to the work done on the air by the rotor 2. The amount of work done by the rotor can be altered by, for example, altering the camber of the blades 12 or the width ratio of the passage between the blades 12. That is, the geometric parameters of camber and width ratio give a measure of the aerodynamic duty or work done by the rotor 2 on the air. These parameters will be defined below with reference to FIG. 1C.

In FIG. 1C an angle $X_1$ is defined between a line projected out from the leading edge 16 of the blade 12 and a projection of the direction of the axis of rotation. A second angle $X_2$ is defined between a line projected out from the trailing edge of the blades 12 and a projection of the direction of the axis of rotation. The lines projected out from the leading edge 16 and trailing edge 18 are continuations of a line drawn along the centre of the cross section of the blade 12.

The camber of the blade 12 is then given by $X_1$-$X_2$. The camber of the blade 12 may vary along the span of the blade from the hub 14 to the tip 15.

In FIG. 1C a distance A1 is defined as the distance between the lines projected from the leading edges 16 of two adjacent blades 12 on the rotor 2. A second distance A2 is defined as the distance between the lines projected from the trailing edges 18 of two adjacent blades 12 on the rotor 2.

The width ratio is then given by A2/A1 or $\cos X_1 / \cos X_2$.

The aerodynamic duty or work of the rotor 2 can be increased by, for example, increasing the camber and/or the width ratio of the blades 12 for a given operating speed. Increasing the aerodynamic duty or work of the rotor increases the pressure ratio achieved across the rotor 2 when it is in use in a compressor 4 of a gas turbine 6, as illustrated in FIG. 5.

However, applying greater aerodynamic duty to the rotor 2 may cause problems in relation to the stability and the operability of the rotor 2 when in use in a compressor 4.

FIG. 1C illustrates air flow across the pressure side 17 and suction side 19 of one of the illustrated blades 12. A section of diffusing flow 46 across the suction side 19 of the blade 12 is also illustrated. In the illustrated example, as the air flows over the suction side 19 of the blade 12 there is diffusion of the boundary layer on the suction surface 19.

An increase in the aerodynamic duty or work of the rotor 2, by for example increasing the camber of the blades 12 or increasing the width ratio, increases the amount of suction surface 19 boundary layer diffusion that occurs. As the amount of diffusion increases blade losses (and hence performance of the rotor 2) will become worse and the limit at which the aerofoil (blade 12) boundary layer separates will be approached.

The increase in boundary layer diffusion may give rise to stall/surge phenomena and will therefore reduce the operating margin of the compressor 4 for its required application.

As described with reference to FIG. 1B, the profile 32 of the endwall 13 causes relative acceleration of the flow of air across the blade 12 in the meridional plane. The relative acceleration of the air across the blade 12 due to the endwall 13 profile 32 counteracts the diffusing flow caused by a greater amount of aerodynamic duty or work of the rotor 2.

The profile 32 of the endwall, which causes relative acceleration of the flow of air across the blade 12 in the meridional plane, allows greater aerodynamic duty or work to be done by the rotor 2 while still achieving acceptable performance of the rotor 2 with regards to operability and stability margins.

It is again noted that overall there will be a static pressure rise of the airflow across the blade 12, even though there is a contraction in the meridional plane (which alone would cause a fall in the static pressure).

Figures 2A, 2B:
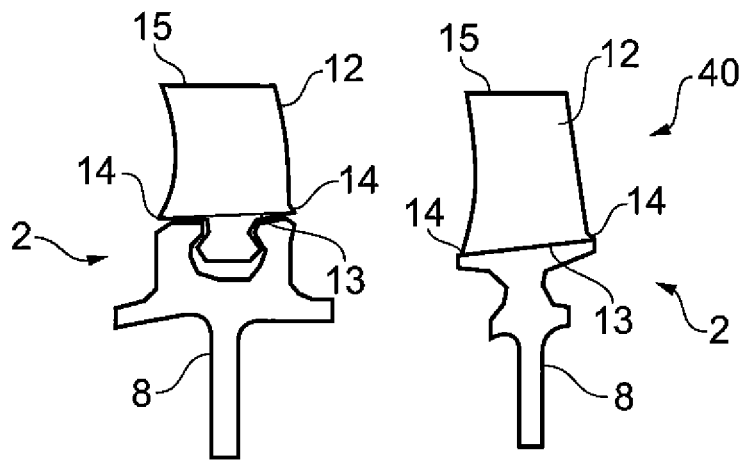
FIG. 2A illustrates an example of a blade attached to a rotatable support by means of a dovetail root attachment.
FIG. 2B illustrates an example of a blisk.

Compressor rotor blades 12 within gas turbines are traditionally attached to the rotatable support 8 by means of a dovetail root attachment an example of which is illustrated in FIG. 2A.

Alternatively, the blades 12 and the rotatable support may be one integral part an example of which is illustrated in the right image of FIG. 2B. Such an integrated rotatable support 8 may be a disk. If the disk is substantially solid and the blades and disk are one integral part a blisk 40 is formed. If the disk is annular and the blades and disk are one integral part a bling is formed.

If the blades 12 are attached to the rotatable support 8 by means of a dovetail root attachment, the frictional contact within the dovetail root provides mechanical damping of the rotor 2.

The trend towards lighter weight components has driven the development of blisk/bling rotors, however, the inherent mechanical damping provided by frictional contact within the dovetail root attachment is no longer present in a blisk/bling. This can cause potential blisk/bling vibration and fatigue problems.

These issues with blisk/bling rotors may be addressed by 'eiffel-towering' the blade 12 thickness, progressively increasing the thickness of the blade 12 towards the hub 14. An example of the thickness profile of a blisk blade 12 is illustrated in FIG. 3.

Figure 3:
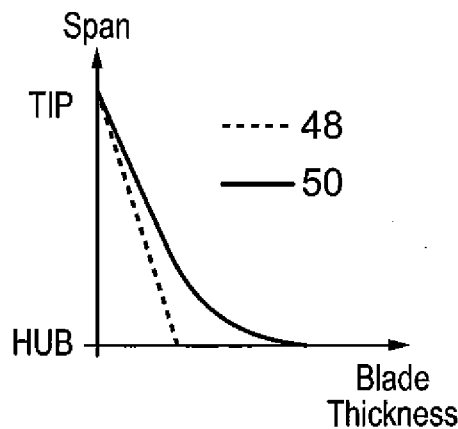
FIG. 3 illustrates an example of the thickness profile of a blisk blade.

FIG. 3 illustrates an example of a thickness profile for a dovetailed rotor blade 12 and a blisk rotor blade 12. The thickness profile of the conventional rotor blade 12 is illustrated by the dashed line 48 in FIG. 3 and the thickness profile of the blisk rotor blade 12 is illustrated by the solid line 50 in FIG. 3.

It can be seen from the example profiles illustrated in FIG. 3 that the blisk rotor blade 12 is significantly thicker than the conventional rotor blade 12 at the hub 14.

For example, a blisk blade 12 may have the following thicknesses up the span of the blade 12, from the hub 14 to the tip 15:

Hub: 5.5 mm to 5.9 mm
10%: 4.9 mm to 5.3 mm

20%: 4.4 mm to 4.8 mm
30%: 3.8 mm to 4.2 mm
Tip: 1.8 mm to 2.2 mm

In the example illustrated in FIG. 3 the x-axis has a false origin as the blade thickness is not zero at the tip.

From an aerodynamic perspective the increase in thickness can detrimentally affect the compressor 4 performance and the operability/surge margin of the compressor 4.

This is because for any given aerofoil, for example a blade 12 of a rotor 2, an increase in thickness will result in an increased amount of suction surface 19 boundary layer diffusion, due to a more adverse pressure gradient.

The blade losses and hence performance will become worse as the amount of diffusion increases and the limit at which the boundary layer separates, giving rise to stall/surge phenomena, will be approached. This reduces the operating margin of the compressor 2 comprising the blisk 40 for its required application. In such circumstances the aerodynamic penalty for using blisk technology may outweigh any potential weight benefit.

However, the inventors have realised that the relative acceleration of the flow of air across the blade 12 due to the changing profile 32 of the endwall 13 may be used to mitigate, or even prevent, the increase in diffusion across the blades 12 caused by the increased thickness requirements of a blisk 40.

With a sufficient amount of narrowing of the passage between the endwall 13 and the casing 27, the static pressure rise/deceleration on the blade suction surface 19, which is highly sensitive to the local thickness-to-chord ratio, is balanced by the reduced diffusion in the meridional plane due to the endwall 13 profile 32. Matching these two opposing effects will allow the boundary layer flow to pass over a thickened blade section relatively unimpeded where it would otherwise separate.

It is also possible to mitigate the effect of higher blade thickness by increasing the length of the chord 20 of the blades 12. However, increasing the length of the chord 20 would increase the weight and length of the rotor 2 comprising the blades. This in turn would mean an increase in the weight and length of a gas turbine 6 in which the rotor 2 operates.

The use of an endwall profile 32 as described herein allows for blades having increased thickness to be used with minimal impact on the required length and weight of the rotor 2/gas turbine 6.

Due to the nature of the effect that the profile 32 of the endwall 13 has on the flow across the blade 12 both an increased aerodynamic duty or work and the blade thickening required for the use of a blisk 40 may be implemented in the rotor 2. This can be understood with reference to FIG. 4.

Figure 4:
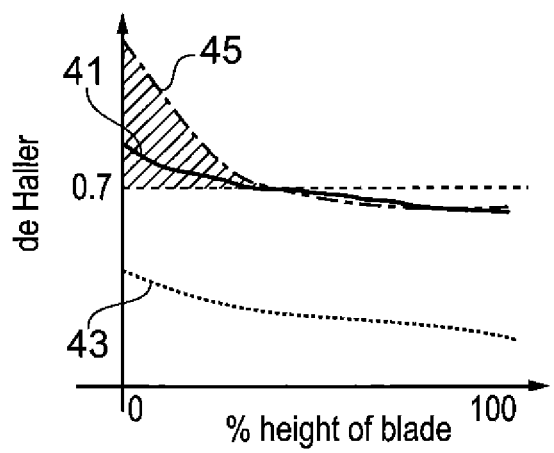
FIG. 4 illustrates an example of a plot of percentage height of blade against de Haller number for a blade.

FIG. 4 illustrates an example of a plot of percentage height of blade of the leading edge of the blade 16, wherein 0 percent is at the hub 14 and 100 percent is at the tip 15, against the de Haller number. The de Haller number is given by $$V_2/V_1$$

Where $V_1$ is the velocity of the airflow entering the blades 12 and $V_2$ is the velocity of the airflow leaving the blades 12. The de Haller number gives a measure of the effect on the airflow across the whole of the blade 12 as it combines all of the effects in all dimensions. The de Haller number therefore incorporates the effect of the profile 32 of the endwall 13 and the camber and width ratio of the blade 12.

It is well established in the art that it is undesirable to have a de Haller number lower than approximately 0.7 for the flow across a rotor of a compressor. This is because having a de Haller number lower than approximately 0.7 indicates that the rotor 2 will have stability/operability problems in use.

It is also well established in the art that it is undesirable to have a rotor 2 with a de Haller number too much in excess of approximately 0.7 as this is an indication that the rotor 2 is not being utilised to its maximum potential, resulting in an inefficient compressor.

It is therefore desirable for a rotor 2 to have a de Haller number of approximately 0.7 along the full extent of the blade 12 as this gives a balance between the stability and efficiency of the compressor. An example of a desirable profile of de Haller number along the extent of a blade 12 is illustrated by line 41 in FIG. 4.

As described above, it is desirable to increase the amount of aerodynamic duty or work of a rotor 2 by, for example, increasing the camber and/or the width ratio of the blades. This can lead to stability/operability issues with the rotor 2 as can be seen by the drop in the de Haller number between line 41 and line 43 in FIG. 4.

The inventors have realised that this effect can be obviated by making use of an endwall profile 32 as described above. The use of such an endwall profile 32 results in a reduction in diffusion of the airflow in the meridional plane, which causes $V_2$ to increase and which therefore causes the de Haller number to increase. This effect is illustrated by line 45 in FIG. 4.

It can be seen from FIG. 4, that the use of an endwall profile 32 as described above off loads the blade 12 more in the region of the hub 14 than the rest of the blade 12. This is illustrated by the hatched region in FIG. 4.

The inventors have realised that as the use of blisk technology requires a greater degree of thickening of the blade 12 at the hub 14 compared to the rest of the blade (as illustrated in FIG. 3), the extra off loading of the blade at the hub 14 provided by the use of an endwall profile 32 as described above can be used to compensate for the aerodynamic penalty caused by the thickening of the hub 14 of a blisk blade 12.

Through the application of a blade profile 32 as described above the blade thickness requirement for fatigue strength and integrity can be achieved without a significant reduction in performance and operability. This occurs because the increased boundary layer diffusion/deceleration, due to the increased thickness of the blade, is offset by the contraction due to the endwall profile 32.

Through the application of this endwall feature, more aerodynamic loading can then be put onto the rotor which offers significant performance improvements.

Table 1A illustrates geometric details that are indicative of an example of the prior art.

TABLE 1A

Geometric details indicative of an example of the prior art

| | Hub | | Aerodynamic duty or work | |
|---|---|---|---|---|
| | thickness-chord ratio (%) | Endwall shape Radius change (R2 − R1)/L (%) | Camber (deg) | Width Ratio A2/A1 |
| Example of Prior Art | <9% | <13% | <32 | <1.9 |

The above figures in table 1A are not arbitrary, they represent an accepted balance for these parameters in an example of a prior art rotor. These figures cannot be arbitrarily altered without affecting, for example, the stability or efficiency of the rotor.

The endwall profile 32 is parameterised in table 1A by the radius change which is given by a difference between the trailing-edge-hub-radius 26 and the leading-edge-hub-radius 24 as a percentage of the length L of the axial chord 36.

In embodiments the radius change may be greater than 15 percent. In other embodiments the radius change may be greater than 20 percent or greater than 25 percent.

Embodiments allow for a significant improvement over the values in the example of the prior art. For example, embodiments allow for a hub thickness to chord ratio greater than 10 percent. A hub thickness to chord ratio greater than 12 percent or 13 percent is also provided for in embodiments.

Embodiments also provide for an increased amount of aerodynamic duty or work to be done by the rotor. For example, embodiments allow for increased camber of the blades and/or increased width ratio compared to the indicative values of an example of the prior art given in table 1A.

TABLE 1B

Geometric details of an example of embodiments

| | Hub | | Aerodynamic duty or work | |
|---|---|---|---|---|
| | thickness-chord ratio (%) | Endwall shape Radius change (R2 − R1)/L (%) | Camber (deg) | Width Ratio A2/A1 |
| Example of embodiments | >12% | >25% | >38 | >2.2 |

Table 1B illustrates specific values for an example embodiment. In this embodiment a stable efficient rotor 2 that does more work and comprises thicker blades 12, at least at the hub 14, is provided.

FIG. 5 is a schematic illustration of at least part of a compressor 4 in a gas turbine 6 comprising a rotor 2 as described above. Two stages of the compressor 4 are illustrated in FIG. 5. However, the compressor may comprise less than or more than two stages. The gas turbine 6 may be a gas turbine engine or a gas turbine motor.

A stage of the compressor 4 comprises a rotor 2 and an adjacent downstream static vane or stator vane 3. The front stage 28 of the compressor 4 is the stage of the compressor 4 that is first in the direction of airflow when the compressor is in use.

A rotor 2 as described above may be located in a compressor 4 of a gas turbine 6 as illustrated in FIG. 5. The rotor 2 may be located in the front stage of the compressor 4 and/or may be located in one of the subsequent stages of the compressor 4.

The gas turbine 6 may comprise multiple compressors 4, for example, low pressure, intermediate pressure and high pressure compressors 4. A rotor 2 (as described above) may be located in one or more stages of one or more of the multiple compressors of the gas turbine 6. In addition the compressor 4 may be a core compressor 30.

One or more of the compressors 4 comprising rotor 2 may have a fixed geometry. That is, one or more of the compressors 4 may have no variable static vanes, such as the stator vanes 3.

Embodiments as described above may have particular application in a front stage 28 rotor 2 because they can have thicker blades 12, at least at the hub 14.

Embodiments may have particular application in the large scale transportation of civilians. For example, the gas turbine 6 may be for use in a civil aircraft which may be used in the transportation of over 100 civilian passengers.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The invention claimed is:

1. A rotor, for a compressor of a gas turbine, comprising:
a rotatable support for rotation about an axis of rotation; and
a plurality of blades, each blade comprising a hub, a leading edge and a trailing edge wherein a chord is defined between the leading edge and the trailing edge;
wherein:
each of the blades extends from its hub away from the rotatable support;
at least one of the blades has a hub-thickness to chord ratio greater than 10 percent;
the leading edge of the at least one of the blades at its hub is positioned at a leading-edge-hub-radius from a position of the axis of rotation;
the trailing edge of the at least one of the blades is positioned at its hub at a trailing-edge-hub-radius from the position of the axis of rotation;
the trailing-edge-hub-radius is greater than the leading-edge-hub-radius;
a distance A1 is defined as the distance between lines projected from the leading edges of two adjacent blades and a distance A2 is defined as the distance between lines projected from the trailing edges of the two adjacent blades, the ratio A2/A1 being greater than 2.2;
an axial chord of the at least one of the blades is defined by a projection of the chord onto the axis of rotation and has an axial chord length; and
for the at least one of the blades the difference between the trailing-edge-hub-radius and the leading-edge-hub-radius is greater than 25 percent of the axial chord length.

2. A rotor as claimed in claim 1, wherein the rotatable support is a disk and the plurality of blades and the disk are one integral part.

3. A rotor as claimed in claim 1, wherein the rotor is a gas turbine front-stage compressor rotor.

4. A rotor as claimed in claim 1, wherein the rotor is a gas turbine high pressure core-compressor rotor.

5. A rotor as claimed in claim 1, wherein the at least one of the blades has a hub-thickness to chord ratio greater than 12 percent.

6. A rotor as claimed in claim 5, wherein:
an angle X1 is defined between a line projected out from the leading edge of one of the blades and a projection of the direction of the axis of rotation;
an angle X2 is defined between a line projected out from the trailing edge of the said one of the blades and a projection of the direction of the axis of rotation; and
a camber of the blade given by X1-X2 is greater than 38 degrees.

7. A rotor as claimed claim 1, wherein the at least one of the blades has a hub-thickness to chord ratio greater than 13 percent.

8. A rotor as claimed in claim 1, wherein the position of the hub of the at least one of the blades from the position of the axis of rotation is defined by a hub radius of the at least one of the blades and the hub radius has a profile between the leading edge of the at least one of the blades and the trailing edge of the at least one of the blades and wherein there is a single point of inflection in the profile of the hub radius between the leading edge of the at least one of the blades and the trailing edge of the at least one of the blades.

9. A rotor as claimed in claim 8, wherein the profile of the hub radius between the leading edge of the at least one of the blades and the trailing edge of the at least one of the blades is axi-symmetric with regard to the axis of rotation.

10. A gas turbine comprising a rotor as claimed in claim 1.

11. A rotor as claimed in claim 1, wherein:
an angle X1 is defined between a line projected out from the leading edge of one of the blades and a projection of the direction of the axis of rotation;
an angle X2 is defined between a line projected out from the trailing edge of the said one of the blades and a projection of the direction of the axis of rotation; and
a camber of the blade given by X1-X2 is greater than 38 degrees.

12. A rotor as claimed in claim 1, wherein the rotor has a de Haller number of approximately 0.7 along a full extent of the blade.

13. A rotor, for a compressor of a gas turbine, comprising:
a rotatable support for rotation about an axis of rotation; and
a plurality of blades, each blade comprising a hub, a leading edge and a trailing edge wherein a chord is defined between the leading edge and the trailing edge and wherein:
each of the blades extends from its hub away from the rotatable support;
at least one of the blades has a hub-thickness to chord ratio greater than 10 percent;
the leading edge of the at least one of the blades at its hub is positioned at a leading-edge-hub-radius from a position of the axis of rotation; and
the trailing edge of the at least one of the blades is positioned at its hub at a trailing-edge-hub-radius from the position of the axis of rotation wherein the trailing-edge-hub-radius is greater than the leading-edge-hub-radius;
wherein an axial chord of the at least one of the blades is defined by a projection of the chord onto the axis of rotation and has an axial chord length, and wherein for the at least one of the blades the difference between the trailing-edge-hub-radius and the leading-edge-hub-radius is greater than 20 percent of the axial chord length.

14. A rotor as claimed in claim 13, wherein the rotor has a de Haller number of approximately 0.7 along a full extent of the blade.

15. A rotor, for a compressor of a gas turbine, comprising:
a rotatable support for rotation about an axis of rotation; and
a plurality of blades, each blade comprising a hub, a leading edge and a trailing edge wherein a chord is defined between the leading edge and the trailing edge;
wherein:
each of the blades extends from its hub away from the rotatable support;
at least one of the blades has a hub-thickness to chord ratio greater than 10 percent;
the leading edge of the at least one of the blades at its hub is positioned at a leading-edge-hub-radius from a position of the axis of rotation;
the trailing edge of the at least one of the blades is positioned at its hub at a trailing-edge-hub-radius from the position of the axis of rotation;
the trailing-edge-hub-radius is greater than the leading-edge-hub-radius;
an angle X1 is defined between a line projected out from the leading edge of one of the blades and a projection of the direction of the axis of rotation;
an angle X2 is defined between a line projected out from the trailing edge of the said one of the blades and a projection of the direction of the axis of rotation;
a camber of the blade given by X1-X2 is greater than 38 degrees;
an axial chord of the at least one of the blades is defined by a projection of the chord onto the axis of rotation and has an axial chord length; and
for the at least one of the blades the difference between the trailing-edge-hub-radius and the leading-edge-hub-radius is greater than 25 percent of the axial chord length.

16. A rotor according to claim 15, wherein the hub-thickness to chord ratio is greater than 12 percent.

17. A rotor as claimed in claim 15, wherein the rotatable support is a disk and the plurality of blades and the disk are one integral part.

18. A rotor as claimed claim 15, wherein the at least one of the blades has a hub-thickness to chord ratio greater than 13 percent.

19. A rotor as claimed in claim 15, wherein:
the position of the hub of the at least one of the blades from the position of the axis of rotation is defined by a hub radius of the at least one of the blades;
the hub radius has a profile between the leading edge of the at least one of the blades and the trailing edge of the at least one of the blades; and
there is a single point of inflection in the profile of the hub radius between the leading edge of the at least one of the blades and the trailing edge of the at least one of the blades.

20. A rotor as claimed in claim 15, wherein the profile of the hub radius between the leading edge of the at least one of the blades and the trailing edge of the at least one of the blades is axi-symmetric with regard to the axis of rotation.

21. A rotor as claimed in claim 15, wherein the rotor has a de Haller number of approximately 0.7 along a full extent of the blade.

* * * * *